United States Patent
Lynch et al.

(10) Patent No.: US 6,350,829 B1
(45) Date of Patent: Feb. 26, 2002

(54) SUPPORTED CATALYST SYSTEMS

(75) Inventors: John Lynch, Monsheim; David Fischer, Gönnheim; Hans-Helmut Görtz, Freinsheim; Günther Schweier, Friedelsheim, all of (DE)

(73) Assignee: Basell Polyolefin GmbH, Ludwigshafen (DE)

( * ) Notice: Subject to any disclaimer, the term of this patent is extended or adjusted under 35 U.S.C. 154(b) by 0 days.

(21) Appl. No.: 09/125,377

(22) PCT Filed: Feb. 19, 1997

(86) PCT No.: PCT/EP97/00769

§ 371 Date: Aug. 17, 1998

§ 102(e) Date: Aug. 17, 1998

(87) PCT Pub. No.: WO97/31038

PCT Pub. Date: Aug. 28, 1997

(30) Foreign Application Priority Data

Feb. 20, 1996 (DE) .......................................... 196 06 167

(51) Int. Cl.$^7$ .............................. C08F 4/44; C08F 4/12; B01J 31/14
(52) U.S. Cl. ....................... 526/151; 526/155; 526/160; 502/104; 502/117; 502/152; 502/132
(58) Field of Search ................................ 526/943, 160, 526/151, 155; 502/110, 113, 114, 115, 117, 132, 139, 104, 152

(56) References Cited

U.S. PATENT DOCUMENTS 5,422,325 A * 6/1995 Jejelowo et al. ............ 502/104
5,959,046 A * 9/1999 Imuta et al. ................. 526/127

FOREIGN PATENT DOCUMENTS

| | | |
|---|---|---|
| CA | 2116404 | 9/1994 |
| EP | 323 716 | 7/1989 |
| EP | 0 500 944 A1 * | 9/1992 |
| EP | 589 638 | 3/1994 |
| EP | 613 908 | 9/1994 |
| EP | 0 628 574 A1 * | 12/1994 |
| WO | 91 09882 | 7/1991 |
| WO | 94 03506 | 2/1994 |
| WO | 95 14044 | 5/1995 |
| WO | WO 95/15815 * | 6/1995 |

OTHER PUBLICATIONS

Jr. Org. Chem., 396 (1989) 359–370, Wiesenfeldt et al.

* cited by examiner

Primary Examiner—David W. Wu
Assistant Examiner—R. Harlan

(74) Attorney, Agent, or Firm—Keil & Weinkauf

(57) ABSTRACT

Supported catalyst systems are obtainable by

A) reaction of an inorganic carrier with a metal compound of the general formula I $$M^1(R^1)_r(R^2)_s(R^3)_t(R^4)_u \qquad \text{I}$$

where
  $M^1$ is an alkali metal, an alkaline earth metal or a metal of main group III or IV of the Periodic Table,
  $R^1$ is hydrogen, $Ch_1$–$C_{10}$-alkyl, $C_6$–$C_{15}$-aryl, alkylaryl or arylalkyl each having 1 to 10 carbon atoms in the alkyl radical and 6 to 20 carbon atoms in the aryl radical,
  $R^2$ to $R^4$ are each hydrogen, halogen, $C_1$–$C_{10}$-alkyl, $C_6$–$C_{15}$-aryl, alkylaryl, arylalkyl, alkoxy or dialkylamino each having 1 to 10 carbon atoms in the alkyl radical and 6 to 20 carbon atoms in the aryl radical,
  r is an integer from 1 to 4 and
  s, t and u are integers from 0 to 3 the sum r+s+t+u corresponding to the valency of $M^1$, B) reaction of the material obtained according to A) with a metallocene complex in its metal dihalide form and a compound forming metallocenium ions and C) subsequent reaction with a metal compound of the general formula II $$M^2(R^5)_o(R^6)_p(R^7)_q \qquad \text{II}$$

where
  $M^2$ is an alkali metal, an alkaline earth metal or a metal of main group III of the Periodic Table,
  $R^5$ is hydrogen, $C_1$–$C_{10}$-alkyl, $C_6$–$C_{15}$-aryl, alkylaryl or arylalkyl each having 1 to 10 carbon atoms in the alkyl radical and 6 to 20 carbon atoms in the aryl radical,
  $R^6$ and $R^7$ are hydrogen, halogen, $C_1$–$C_{10}$-alkyl, $C_6$–$C_{15}$-aryl, alkylaryl, arylalkyl or alkoxy each having 1 to 10 carbon atoms in the alkyl radical and 6 to 20 carbon atoms in the aryl radical,
  o is an integer from 1 to 3 and
  p and q are integers from 0 to 2 the sum o+p+q corresponding to the valency of $M^2$.

17 Claims, No Drawings

SUPPORTED CATALYST SYSTEMS

The present invention relates to supported catalyst systems obtainable by

A) reaction of an inorganic carrier with a metal compound of the general formula I

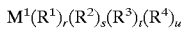
$$M^1(R^1)_r(R^2)_s(R^3)_t(R^4)_u \qquad \text{I}$$

where
- $M^1$ is an alkali metal, an alkaline earth metal or a metal of main group III or IV of the Periodic Table,
- $R^1$ is hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical,
- $R^2$ to $R^4$ are each hydrogen, halogen, $C_1$–$C_{10}$-alkyl, $C_6$–$C_{15}$-aryl, alkylaryl, arylalkyl, alkoxy or dialkylamino, each having 1 to 10 carbon atoms in the alkyl radical and 6 to 20 carbon atoms in the aryl radical,
- r is an integer from 1 to 4 and
- s, t and u are integers from 0 to 3, the sum r+s+t+u corresponding to the valency of $M^1$, B) reaction of the material obtained according to A) with a metallocene complex in its metal dihalide form and a compound forming metallocenium ions and C) subsequent reaction with a metal compound of the general formula II

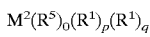
$$M^2(R^5)_o(R^1)_p(R^1)_q \qquad \text{II}$$

where
- $M^2$ is an alkali metal, an alkaline earth metal or a metal of main group III of the Periodic Table,
- $R^5$ is hydrogen, $C_1$–$C_{10}$-alkyl, $C_6$–$C_{15}$-aryl, alkylaryl or arylalkyl each having 1 to 10 carbon atoms in the alkyl radical and 6 to 20 carbon atoms in the aryl radical,
- $R^6$ and $R^7$ are each hydrogen, halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms in the aryl radical,
- o is an integer from 1 to 3 and
- p and q are integers from 0 to 2, the sum o+p+q corresponding to the valency of $M^2$.

The present invention furthermore relates to processes for the preparation of such supported catalyst systems and their use for the preparation of polyolefins.

In recent years, homogeneous metallocene catalysts have made it possible to obtain well defined poly-l-olefins having a narrow molecular weight distribution and high chemical uniformity. However, industrial use necessitates the conversion of these catalysts to heterogeneous form so that simple handling of the catalyst and effective control of the morphology of the product are ensured. Supported metallocene catalysts are known per se. Thus, EP-A 323 716 describes those systems in which moist $SiO_2$ is reacted with a trialkyl aluminum to give an alumoxane-laden carrier. The metallocene is applied to this carrier, an active catalyst being formed.

WO 91/09882 discloses the preparation of a supported, cationic metallocene catalyst by applying the reaction mixture of the dialkylmetallocene with an ionic compound, which has a Bronsted acid as the cation and a noncoordinating opposite ion, such as tetrakis(pentafluorophenyl) borate, as the anion, to an inorganic carrier. Here too, an active catalyst is obtained.

Similar supported catalyst systems are also disclosed in WO 94/03506 and WO 95/14044.

EP-A 628 574 describes supported catalyst systems in which a metallocene dihalide is reacted with an alkyl aluminum in the presence of a hydridoborate and this solution, which is active with respect to polymerization, is applied to a carrier.

Such catalysts which are already active readily give rise to problems in the metering of the catalyst into the reactor. What is therefore advantageous is a catalyst which is still inactive and cannot be activated until a later stage, for example during metering or in the reactor itself.

EP-A 613 908 discloses supported metallocene catalyst systems, some of which are not activated until they are in the reactor. Here, however, the polymers formed have a broad molecular weight distribution $M_w/M_n$.

WO 95/15815 describes catalysts which are obtained by supporting a metallocene dichloride and a borate on a crosslinked polymer. The use of deactivated inorganic carriers gives catalysts which, after activation in the polymerization reactor, have either only slight activity or no activity at all.

It is an object of the present invention to provide supported catalyst systems which do not have the stated disadvantages, in particular can be activated at any desired time, are air- and moisture-insensitive, can be stored for a long time and are not flammable, the polymers formed having a narrow molecular weight distribution.

We have found that this object is achieved by the supported catalyst systems defined at the outset.

We have furthermore found processes for the preparation of such supported catalyst systems and their use for the preparation of polyolefins.

The novel supported catalyst systems are obtainable by reacting an inorganic carrier with a metal compound of the general formula I in a first stage A).

Preferably used carriers are finely divided solids whose particle diameters are from 1 to 200 μm, in particular from 30 to 70 μm.

Examples of suitable carriers are silica gels, preferably those of the formula $SiO_2$ a $Al_2O_3$, where a is from 0 to 2, preferably from 0 to 0.5; these are therefore aluminosilicates or silica.

Such products are commercially available, for example Silica Gel 332 from Grace.

Other inorganic compounds, such as $Al_2O_3$ or $MgCl_2$, or mixtures containing these compounds may also be used as carriers.

Preferred metal compounds of the general formula I are those in which $M^1$ is a metal of main group III of the Periodic Table, in particular aluminum, $R^1$ is $C_1$–$C_{10}$-alkyl and $R^2$ to $R^4$ are each $C_1$–$C_{10}$-alkyl. For the particularly preferred case where $M^1$ is aluminum, u is zero and $R^1$ to $R^3$ have in particular the same meaning, preferably methyl, ethyl, isobutyl or hexyl, preferably isobutyl.

Preferably, the metal compound of the general formula I is added as a solution to a suspension of the carrier. Particularly suitable solvents or suspending agents are hydrocarbons, such as heptane. The amount of metal compound I may be varied within wide limits, the minimum amount depending on the number of hydroxyl groups of the carrier. The temperatures, reaction times and pressures are not critical per se, temperatures of from 0 to 80° C. and reaction times of from 0.1 to 48 hours being preferred.

It has proven suitable to remove the excess metal compound I by thorough washing, for example with hydrocarbons, such as pentane or hexane, after the carrier pretreatment and to dry the carrier.

The material thus prepared can be stored for up to 6 months and is not pyrophoric.

This material is then reacted, in a further stage B), with a metallocene complex in its metal dihalide form and a compound forming metallocenium ions.

Examples of suitable metallocene complexes are the following compounds of the general formula III:

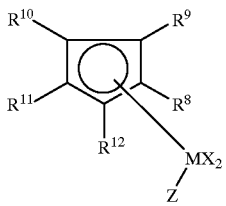

where

M is titanium, zirconium, hafnium, vanadium, niobium or tantalum, x is fluorine, chlorine, bromine or iodine, $R^8$ to $R^{12}$ are each hydrogen, $C_1$–$C_{10}$-alkyl, 5- to 7-membered cycloalkyl which in turn may carry a $C_1$–$C_{10}$-alkyl as a substituent, $C_6$–$C_{15}$-aryl or arylalkyl, where two adjacent radicals together may furthermore form a cyclic group of 4 to 15 carbon atoms, or $Si(R^{13})_3$, where $R^{13}$ is $C_1$–$C_{10}$-alkyl, $C_3$–$C_{10}$-cycloalkyl or $C_6$–$C_{15}$-aryl, and z is X or

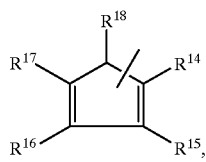

where $R^{14}$ to $R^{18}$ are each hydrogen, $C_1$–$C_{10}$-alkyl, 5- to 7-membered cycloalkyl which in turn may carry a $C_1$–$C_{10}$-alkyl as a substituent, $C_6$–$C_{15}$-aryl or arylalkyl, where two adjacent radicals together may furthermore form a cyclic group of 4 to 15 carbon atoms, or $Si(R^{19})_3$, where $R^{19}$ is $C_1$–$C_{10}$-alkyl, $C_6$–$C_{15}$-aryl or $C_3$–$C_{10}$-cycloalkyl, or where $R^{11}$ and Z together form a group —$R^{20}$—A—, where

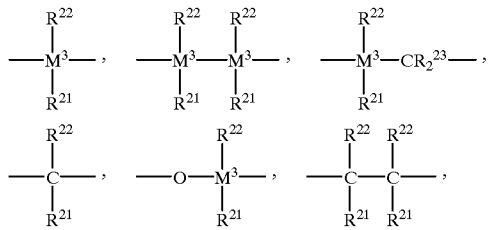

=$BR^{22}$, =$AlR^{22}$, —Ge—, —Sn—, —O—, —S—, =SO, =$SO_2$, =$NR^{22}$, =CO, =$PR^{22}$ or =$P(O)R^{22}$, where $R^{21}$, $R^{22}$ and $R^{23}$ are identical or different and are each hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl or where two adjacent radicals together with the atoms linking them may form a ring, and $M^3$ is silicon, germanium or tin, A is —O—, —S—, $\diagdown NR^{24}$ or $\diagdown PR^{24}$, where $R^{24}$ is $C_1$–$C_{10}$-alkyl, $C_6$–$C_{15}$-aryl, $C_3$–$C_{10}$-cycloalkyl, alkylaryl or $Si(R^{25})_3$ and $R^{25}$ is hydrogen, $C_1$–$C_{10}$-alkyl, $C_6$–$C_{15}$-aryl, which in turn may be substituted by $C_1$–$C_4$-alkyl, or $C_3$–$C_{10}$-cycloalkyl or where $R^{11}$ and $R^{17}$ together form a group —$R^{20}$—.

Among the metallocene complexes of the general formula III,

IIIa

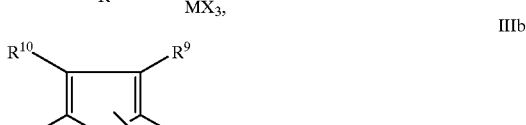

IIIb

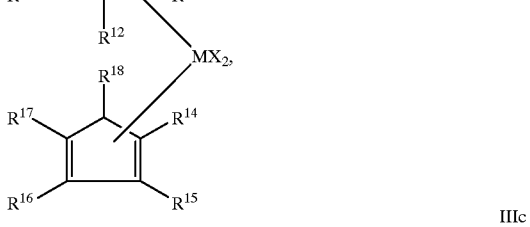

IIIc

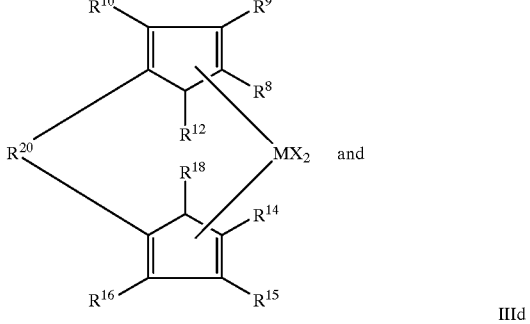

IIId

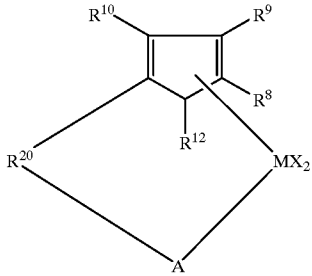

are preferred.

The radicals X may be identical or different but are preferably identical.

Particularly preferred compounds of the formula IIIa are those in which

M is titanium, zirconium or hafnium,

X is chlorine and $R^8$ to $R^{12}$ are each hydrogen or $C_1$–$C_4$-alkyl.

Preferred compounds of the formula IIIb are those in which

M is titanium, zirconium or hafnium,

X is chlorine, $R^8$ to $R^{12}$ are each hydrogen, $C_1$–$C_4$-alkyl or $Si(R^{13})_3$ and $R^{14}$ to $R^{18}$ are each hydrogen, $C_1$–$C_4$-alkyl or $Si(R^{19})_3$.

Particularly suitable compounds of the formula IIIb are those in which the cyclopentadienyl radicals are identical.

Examples of particularly suitable compounds include bis(cyclopentadienyl)zirconium dichloride, bis(pentamethylcyclopentadienyl)zirconium dichloride, bis(methylcyclopentadienyl)zirconium dichloride, bis(ethylcyclopentadienyl)zirconium dichloride, bis(n-butylcyclopentadienyl)zirconium dichloride and bis(trimethylsilylcyclopentadienyl)zirconium dichloride.

Particularly suitable compounds of the formula IIIc are those in which $R^8$ and $R^{14}$ are identical and are each hydrogen or $C_1$–$C_{10}$-alkyl, $R^{12}$ and $R^{18}$ are identical and are each hydrogen, methyl, ethyl, isopropyl or tert-butyl, $R^{10}$ and $R^{16}$ are $C_1$–$C_4$-alkyl $R^9$ and $R^{15}$ are each hydrogen or two adjacent radicals $R^9$ and $R^{10}$ on the one hand and $R^{15}$ and $R^{16}$ on the other hand together form a cyclic group of 4 to 12 carbon atoms,

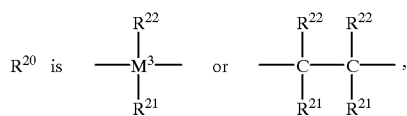

M is titanium, zirconium or hafnium and x is chlorine.

Examples of particularly suitable complex compounds include dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(-3-tert-butyl-5-methylcyclopentadienyl)zirconium [sic] dichloride, dimethylsilanediylbis(-3-tert-butyl-5-ethylcyclopentadienyl)zirconium [sic] dichloride, dimethylsilanediylbis(-2-methylindenyl)zirconium [sic] dichloride, dimethylsilanediylbis(-2-isopropylindenyl)zirconium [sic] dichloride, dimethylsilanediylbis(-2-tert-butylindenyl)zirconium [sic] dichloride, diethylsilanediylbis(-2-methylindenyl)zirconium [sic] dibromide, dimethylsilanediylbis(-3-methyl-5-methylcyclopentadienyl)zirconium [sic] dichloride, dimethylsilanediylbis(-3-ethyl-5-isopropylcyclopentadienyl)zirconium [sic] dichloride, dimethylsilanediylbis(-2-methylindenyl)zirconium [sic] dichloride, dimethylsilanediylbis(-2-methylbenzindenyl)zirconium [sic] dichloride and dimethylsilanediylbis(-2-methylindenyl)hafnium [sic] dichloride.

Particularly suitable compounds of the general formula IIId are those in which

M is titanium or zirconium,

X is chlorine,

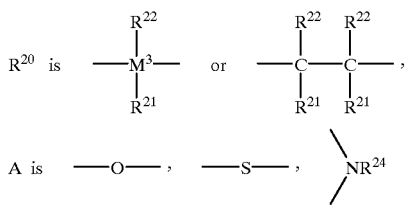

and $R^8$ to $R^{10}$ and $R^{12}$ are each hydrogen, $C_1$–$C_{10}$-alkyl, $C_3$–$C_{10}$-cycloalkyl, $C_6$–$C_{15}$-aryl or $Si(R^{14})_3$, or where two adjacent radicals form a cyclic group of 4 to 12 carbon atoms.

The synthesis of such complex compounds can be carried out by methods known per se, the reaction of the appropriately substituted, cyclic hydrocarbon anions with halides of titanium, zirconium, hafnium, vanadium, niobium or tantalum being preferred.

Examples of appropriate preparation processes are described, inter alia, in J. Organometal. Chem., 369 (1989), 359–370.

Mixtures of different metallocene complexes may also be used.

Particularly suitable compounds forming metallocenium ions are strong, neutral Lewis acids, ionic compounds having Lewis acid cations and ionic compounds having Bronsted acids as cations.

Preferred strong, neutral Lewis acids are compounds of the general formula IV $$M^4X^1X^2X^3 \qquad \text{IV}$$

where $M^4$ is an element of main group III of the Periodic Table, in particular B, Al or Ga, preferably B, and $X^1$, $X^2$ and $X^3$ are each hydrogen, $C_1$–$C_{10}$-alkyl, $C_6$–$C_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred compounds of the general formula IV are those in which $X^1$, $X^2$ and $X^3$ are identical, preferably tris(pentafluorophenyl)borane.

Suitable ionic compounds having Lewis acid cations are compounds of the general formula V $$[(Y^{a+})Q_1Q_2\ldots Q_z]^{d+} \qquad \text{V}$$

in which

Y is an element of main group I to VI or subgroup I to VIII of the Periodic Table, $Q_1$ to $Q_z$ are radicals having a single negative charge, such as $C_1$–$C_{28}$-alkyl, $C_6$–$C_{15}$-aryl, alkylaryl, arylalkyl, haloalkyl, haloaryl each having 6 to 20 carbon atoms in the aryl radical and 1 to 28 carbon atoms in the alkyl radical, $C_1$–$C_{10}$-cycloalkyl, which may be substituted by $C_1$–$C_{10}$-alkyl, or halogen, $C_1$–$C_{28}$-alkoxy, $C_6$–$C_{15}$-aryloxy, silyl or mercaptyl, a is an integer from 1 to 6, z is an integer from 0 to 5 and d corresponds to the difference a–z, but d is greater than or equal to 1.

Carbonium cations, oxonium cations and sulfonium cations and cationic transition metal complexes are particularly suitable. Particular examples are the triphenylmethyl cation, the silver cation and the 1,1'-dimethylferrocenyl cation. They preferably have noncoordinating opposite ions, in particular borane compounds, as also stated in WO 91/09882, preferably tetrakis(pentafluorophenyl)borate.

Ionic compounds having Bronsted acids as cations and preferably also noncoordinating opposite ions are stated in WO 91/09882, a preferred cation being N,N-dimethylanilinium.

The amount of compounds forming metallocenium ions is preferably from 0.1 to 10 equivalents, based on the metallocene complex III.

The conditions for the reaction with the metallocene complex with the compound forming metallocenium ions are not critical per se; the reaction is preferably carried out in solution, particularly suitable solvents being hydrocarbons, preferably aromatic hydrocarbons, such as toluene.

The material prepared according to A) is then added to this. An amount of from 0.1 to 10% by weight, based on the inorganic carrier, of metallocene complex is particularly suitable. The conditions for this reaction are likewise not critical, temperatures of from 20 to 80° C. and reaction times of from 0.1 to 20 hours having proven particularly suitable.

The material obtained according to B) can then be isolated and can be stored for up to at least 6 months.

In a further stage C), the activation stage, the material obtained according to B) is reacted with a metal compound of the general formula II. This activation can be carried out at any desired time, i.e. before, during or after the metering of the material obtained according to B) in the reactor. The activation is preferably carried out after the metering of the material obtained according to B) into the reactor.

Among the metal compounds of the general formula II

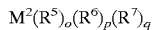

$$M^2(R^5)_o(R^6)_p(R^7)_q \qquad\qquad II$$

where

M$^2$ is an alkali metal, an alkaline earth metal or a metal of main group III of the Periodic Table, ie. boron, aluminum, gallium, indium or thallium, R$^5$ is hydrogen, C$_1$–C$_{10}$-alkyl, C$_6$–C$_{15}$-aryl, alkylaryl or arylalkyl each having 1 to 10 carbon atoms in the alkyl radical and 6 to 20 carbon atoms in the aryl radical, R$^6$ and R$^7$ are each hydrogen, halogen, C$_1$–C$_{10}$-alkyl, C$_6$–C$_{15}$-aryl, alkylaryl, arylalkyl or alkoxy each having 1 to 10 carbon atoms in the alkyl radical and 6 to 20 carbon atoms in the aryl radical, o is an integer from 1 to 3 and p and q are integers from 0 to 2 the sum o+p+q corresponding to the valency of M$^2$, preferred compounds are those in which M$^2$ is lithium, magnesium or aluminum and R$^5$ to R$^7$ are each C$_1$–C$_{10}$-alkyl.

Particularly preferred metal compounds of the general formula II are n-butyl lithium, n-butyl-n-octyl magnesium, n-butyl-n-heptyl magnesium and tri-n-hexyl aluminum.

The conditions for the reaction in stage C) are not critical per se. Temperatures, reaction times and pressures depend on the time when the reaction, ie. activation, is carried out.

With the aid of these novel supported catalyst systems, it is possible to prepare polyolefins, in particular polymers of alk-1-enes. These are understood as meaning homo- and copolymers of C$_2$–C$_{10}$-alk-1-enes, preferably used monomers being ethylene, propylene, but-1-ene, pent-1-ene and hex-1-ene.

However, cycloolefins or higher alk-1-enes and alkenes generally may also be used as monomers for the homo- or copolymerization.

The novel supported catalyst systems are distinguished in particular by high activity, can be activated at any desired time, can be stored for a long time, are not pyrophoric and can therefore be easily handled and lead to polymers having a narrow molecular weight distribution.

EXAMPLES

Examples 1 and 2

Reaction of SiO$_2$ with Tri-isobutyl Aluminum (Stage A))

Example 1

100 g of SiO$_2$ (SG 332 from Grace; dried for 12 hours at 200° C.) were suspended in 1 l of dry heptane. At room temperature, 140 ml of a 2 molar solution of tri-isobutyl aluminum in heptane were added dropwise in the course of 30 minutes, the temperature increasing to 35° C. Thereafter, stirring was carried out overnight and the solid was filtered off and was washed twice with pentane. Drying was then carried out under reduced pressure from an oil pump until the weight remained constant (carrier 1).

Example 2

50 g of SiO$_2$ (ES 70F from Crosfield; dried for 7 hours at 110° C. under reduced pressure) were suspended in 500 ml of dry heptane. At room temperature, 70 ml of a 2 molar solution of tri-isobutyl aluminum in heptane were added dropwise in the course of 30 minutes, the temperature increasing to 35° C. Thereafter, stirring was carried out overnight and the solid was filtered off and was washed with heptane. Drying was then carried out under reduced pressure from an oil pump until the weight remained constant (carrier 2).

Example 3

Reaction with Metallocene Complex and N,N-Dimethylanilinium tetrakis(pentafluorophenyl)borate (Stage B))

0.5 mmol of the respective metallocene complex and in each case 0.5 mmol of N,N-dimethylanilinium tetrakis (pentafluorophenyl)borate were dissolved in 50 ml of absolute toluene at 80° C. In each case 5 g of the material obtained according to Example 1 or 2 were added to this, and the dispersion thus obtained was stirred for 30 minutes at 80° C. Thereafter, the solvent was stripped off at 10 mbar and the solid residue was dried under reduced pressure from an oil pump until a free-flowing powder remained.

Metallocene complexes used:

III 1: Bis(cyclopentadienyl)zirconium dichloride

III 2: Bis(n-butylcyclopentadienyl)zirconium dichloride

III 3: Bis(trimethylsilylcyclopentadienyl)zirconium dichloride

III 4: Dimethylsilanediylbis(indenyl)zirconium dichloride

III 5: Ethylenebis(indenyl)zirconium dichloride

III 6: Dimethylsilanediylbis(-2-methylbenzindenyl) zirconium [sic] dichloride

III 7: Dimethylsilanediyl(N-tert-butylamido)($\eta^5$-2,3,4,5-tetramethylcyclopentadienyl)titanium dichloride Examples 4 to 17

Preparation of Polyethylene in Suspension

A 1 l steel autoclave was heated to 70° C., then the corresponding metal compound II was injected through a lock using 20 ml of isobutane. Thereafter ethylene was introduced into the autoclave up to a pressure of 40 bar and a corresponding amount of the material prepared in Example 3 was blown in with ethylene. The poly-merization was carried out at 70° C. until 200 g of ethylene had been absorbed and was stopped by letting down the pressure.

Metal compounds II used:

II 1: Tri-n-hexyl aluminum

II 2: n-Butyl-n-heptyl magnesium

II 3: n-Butyl lithium

Table 1 below provides information about the compounds used in each case and the properties of the polyethylenes.

The limiting viscosity I was determined according to ISO 1628/3.

TABLE 1

| Ex. | Carrier | Metallocene complex | Amount used of material prepared according to Ex. 3 [mg] | Metal compound | Productivity [g of polymer/g of catalyst]*) | $\eta$ [dl/g] |
|---|---|---|---|---|---|---|
| 4  | 1 | III 1 | 107 | 180 mg II 1 | 1495 | 3.75 |
| 5  | 2 | III 1 | 68  | 168 mg II 1 | 3970 | 4.04 |
| 6  | 2 | III 1 | 88  | 80 mg II 2  | 3460 | 4.06 |
| 7  | 1 | III 2 | 66  | 40 mg II 3  | 2560 | 3.97 |
| 8  | 2 | III 2 | 98  | 80 mg II 2  | 3010 | 4.24 |
| 9  | 2 | III 2 | 54  | 40 mg II 3  | 4900 | 4.05 |
| 10 | 1 | III 3 | 83  | 80 mg II 3  | 228  | 6.34 |
| 11 | 1 | III 4 | 116 | 20 mg II 3  | 1422 | 2.43 |
| 12 | 2 | III 4 | 41  | 60 mg II 2  | 4580 | 2.89 |
| 13 | 2 | III 6 | 94  | 80 mg II 2  | 2660 | 2.11 |
| 14 | 1 | III 7 | 140 | 60 mg II 2  | 2210 | 24.8 |
| 15 | 1 | III 7 | 81  | 20 mg II 3  | 2690 | 22.89 |
| 16 | 1 | III 7 | 250 | 40 mg II 3  | 506  | 21.2 |
| 17 | 1 | III 7 | 197 | 80 mg II 2  | 535  | 20.22 |

*)Catalyst means the product obtained according to stage B)

Examples 18 to 21

Preparation of Polyethylene in the Gas Phase

A 1 l steel autoclave was filled with 80 g of polyethylene granules, heated to 70° C. and flushed with argon for 1 hour. 3 ml of a 0.2 molar solution of tri-n-hexyl aluminum in heptane were then injected. Thereafter, 50 mg of the material prepared in Example 3 were blown in with ethylene, and the ethylene pressure was increased to 40 bar. The polymerization was carried out at 70° C. until 150 g of ethylene had been absorbed and was stopped by letting down the pressure.

Table 2 below provides information about the compounds used and the properties of the polyethylenes.

The limiting viscosity $\eta$ was likewise determined according to 1628/3.

TABLE 2

| Ex. | Carrier | Metallocene complex | Productivity [g of polymer/g of catalyst]*) | $\eta$ [dl/g] |
|---|---|---|---|---|
| 18 | 1 | III 2 | 1604 | 4.52 |
| 19 | 1 | III 4 | 3290 | 2.23 |
| 20 | 1 | III 5 | 2256 | 1.54 |
| 21 | 1 | III 7 | 1306 | 13.9 |

*)Catalyst means the product obtained according to B)

Example 22

Preparation of Polypropylene (Bulk Polymerization)

0.3 l of liquid propene was initially taken at room temperature in a 1 l steel autoclave flushed with nitrogen. 1 mmol of triisobutyl aluminum (as a 2 molar solution in heptane) was added via a lock. After stirring had been carried out for 5 minutes, 72 mg of the material prepared in Example 3 (carrier 1, metallocene complex III6) were added, likewise via the lock, and the autoclave was heated to 60° C. The polymerization was carried out at 70° C. over a period of 10 minutes. 90 g of isotactic polypropylene having a melting point of 144.9° C. were obtained.

We claim:

1. A solid component of a supported catalyst system obtained by a process consisting essentially of the reaction of an inorganic support with a metallocene complex and a compound forming metallocenium ions, wherein A) the support is prepared by reaction of an inorganic carrier with a metal compound of the formula I $$M^1(R^1)_r(R^2)_s(R^3)_t(R^4)_u \qquad I$$

where $M^1$ is an alkali metal, an alkaline earth metal or a metal of main group III or IV of the Periodic Table, $R^1$ is hydrogen, $C_1$–$C_{10}$-alkyl, $C_6$–$C_{15}$-aryl, alkylaryl or arylalkyl each having 1 to 10 carbon atoms in the alkyl radical and 6 to 20 carbon atoms in the aryl radical, $R^2$ to $R^4$ are each hydrogen, halogen, $C_1$–$C_{10}$-alkyl, $C_6$–$C_{15}$-aryl, alkylaryl, arylalkyl, alkoxy or dialkylamino each having 1 to 10 carbon atoms in the alkyl radical and 6 to 20 carbon atoms in the aryl radical, r is an integer from 1 to 4 and s, t and u are integers from 0 to 3, the sum r+s+t+u corresponding to the valency of $M^1$, and subsequent removal of excess metal compound of the formula I and B) the material obtained according to A) is reacted with a metallocene complex in its metal dihalide form and a compound forming metallocenium ions selected from the group consisting of strong, neutral Lewis acids, ionic compounds having Lewis acid cations and ionic compounds having Brönsted acids as cations.

2. A solid component of a supported catalyst system as claimed in claim 1, wherein the inorganic carrier material is dried at a temperature of from 110° C. to 200° C. prior to the reaction with the metal compound of the formula I.

3. A solid component of a supported catalyst system as claimed in claim 1, wherein the reaction of step A) is carried out at a temperature of from 0° C. to 80° C. and a reaction time of from 0.1 to 48 hours.

4. A solid component of a supported catalyst system as claimed in claim 1, wherein the material obtained according to A) is isolated and dried.

5. A solid component of a supported catalyst system as claimed in claim 1, wherein in the formula I, $M^1$ is aluminum, $R^1$ to $R^3$ are each $C_1$–$C_{10}$-alkyl and u is zero.

6. A solid component of a supported catalyst system as claimed in claim 1, wherein, in the formula II, $R^5$ to $R^7$ are each $C_1$–$C_{10}$-alkyl.

7. A supported catalyst system obtained by a process wherein first a solid component of a supported catalyst system is prepared by a process consisting essentially of the reaction of an inorganic support with a metallocene complex and a compound forming metallocenium ions, wherein A) the support is prepared by reaction of an inorganic carrier with a metal compound of the formula I $$M^1(R^1)_r(R^2)_s(R^3)_t(R^4)_u \qquad I$$

where $M^1$ is an alkali metal, an alkaline earth metal or a metal of main group III or IV of the Periodic Table, $R^1$ is hydrogen, $C_1$–$C_{10}$calkyl, $C_6$–$C_{15}$-aryl, alkylaryl or arylalkyl each having 1 to 10 carbon atoms in the alkyl radical and 6 to 20 carbon atoms in the aryl radical, $R^2$ to $R^4$ are each hydrogen, halogen, $C_1$–$C_{10}$-alkyl, $C_6$–$C_{15}$-aryl, alkylaryl, arylalkyl, alkoxy or dialkylamino each having 1 to 10 carbon atoms in the alkyl radical and 6 to 20 carbon atoms in the aryl radical, r is an integer from 1 to 4 and s, t and u are integers from 0 to 3, the sum r+s+t+u corresponding to the valency of $M^1$, and subsequent removal of excess metal compound of the formula I and B) the material obtained according to A) is reacted with a metallocene complex in its metal dihalide form and a compound forming metallocenium ions selected from the group consisting of strong, neutral Lewis acids, ionic compounds having Lewis acid cations and ionic compounds having Bronsted acids as cations, and subsequently said solid component of the catalyst system is C) reacted with a metal compound of the formula II

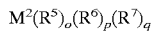    II where $M^2$ is an alkali metal, an alkaline earth metal or a metal of main group III of the Periodic Table, $R^5$ is hydrogen, $C_1$–$C_{10}$-alkyl, $C_6$–$C_{15}$-aryl, alkylaryl or arylalkyl, each having 1 to carbon atoms in the alkyl radical and 6 to 20 carbon atoms in the aryl radical, $R^6$ and $R^7$ are each hydrogen, halogen, $C_1$–$C_{10}$-alkyl, $C_6$–$C_{25}$-aryl, alkylaryl, arylalkyl or alkoxy, each having 1 to 10 carbon atoms in the alkyl radical and 6 to 20 carbon atoms in the aryl radical, o is an integer from 1 to 3 and p and q are integers from 0 to 2, the sum o+p+q corresponding to the valency of $M^2$.

8. A supported catalyst system as claimed in claim 7, wherein the material obtained according to A) is isolated and dried.

9. A supported catalyst system as claimed in claim 7, wherein the inorganic carrier material is dried at a temperature from 110° C. to 200° C. prior to the reaction with the metal compound of the formula I.

10. A supported catalyst system as claimed in claim 7, wherein the reaction of step A) is carried out at a temperature of from 0° C. to 80° C. and a reaction time of from 0.1 to 48 hours.

11. A supported catalyst system as claimed in claim 7, wherein, in the formula I, $M^1$ is aluminum, $R^1$ to $R^3$ are each $C_1$–$C_{10}$-alkyl and u is zero.

12. A supported catalyst system as claimed in claim 7, wherein, in the formula II, $R^5$ to $R^7$ are each $C_1$–$C_{10}$-alkyl.

13. A supported catalyst system as claimed in claim 7, wherein the reaction of the solid component of the catalyst system with the metal compound of the formula II takes place in a polymerization reactor.

14. A process for the preparation of a solid component of a supported catalyst system as recited in claim 1.

15. A process for the preparation of a supported catalyst system as recited in claim 7.

16. A process for producing olefin polymers comprising polymerizing olefins in the presence of a supported catalyst system as claimed in claim 7.

17. The process of claim 16, wherein said olefin polymers are homopolymers or copolymers of ethylene or propylene.

* * * * *

UNITED STATES PATENT AND TRADEMARK OFFICE
CERTIFICATE OF CORRECTION

PATENT NO. : 6,350,829 B1
DATED : February 26, 2002
INVENTOR(S) : Lynch et al.

It is certified that error appears in the above-identified patent and that said Letters Patent is hereby corrected as shown below:

Column 11,
Line 30, "1 to carbon" should be -- 1 to 10 carbon --;
Line 34, "$C_6$-$C_{25}$-aryl" should be -- $C_6$-$C_{15}$-aryl --.

Signed and Sealed this

Twentieth Day of August, 2002

Attest:

Attesting Officer

JAMES E. ROGAN
*Director of the United States Patent and Trademark Office*